United States Patent [19]

Williams

[11] 4,138,345
[45] Feb. 6, 1979

[54] OIL RECOVERY BY SURFACTANT WATERFLOODING

[75] Inventor: Sherrod A. Williams, Dallas, Tex.

[73] Assignee: Mobil Oil Corporation, New York, N.Y.

[21] Appl. No.: 784,983

[22] Filed: Apr. 6, 1977

[51] Int. Cl.² ............................................. E21B 43/22
[52] U.S. Cl. .............................. 252/8.55 D; 166/274; 166/275; 260/509; 260/513 N
[58] Field of Search .................. 252/8.55 D; 166/273, 166/274, 275; 260/509, 513 N

[56] References Cited

U.S. PATENT DOCUMENTS

| | | | |
|---|---|---|---|
| 2,860,160 | 11/1958 | Sundberg et al. | 260/509 X |
| 3,210,410 | 10/1965 | Gaertner | 260/509 |
| 3,469,630 | 9/1969 | Hurd et al. | 166/250 |
| 3,505,396 | 4/1970 | Sanders et al. | 260/513 |
| 3,827,497 | 8/1974 | Dycus et al. | 166/274 |
| 3,977,471 | 8/1976 | Gale et al. | 166/273 |
| 4,008,768 | 2/1977 | Birk | 166/274 |

Primary Examiner—Herbert B. Guynn
Attorney, Agent, or Firm—C. A. Huggett; William D. Jackson

[57] ABSTRACT

A surfactant waterflooding process employing an anionic surfactant for use in oil reservoirs in which the connate waters exhibit high salinities and/or divalent metal ion concentrations in situations in which the available waters exhibit high salinities and/or divalent metal ion concentrations. The anionic surfactant comprises a hydrocarbyl amino ether-linked alkane sulfonate in which the hydrocarbyl group provides a lipophilic base and in which the ether linkage is provided by an alkoxy linkage having a ratio of carbon atoms to oxygen atoms within the range of 2 to 3. The surfactant may be a monosulfonate or disulfonate and may be employed alone or in conjunction with other additives. Thus it may be employed as a cosurfactant in combination with other anionic or nonionic surfactants or in combination with alcohols which function as surfactant cosolvents.

8 Claims, No Drawings

OIL RECOVERY BY SURFACTANT WATERFLOODING

BACKGROUND OF THE INVENTION

This invention relates to the recovery of oil from subterranean oil reservoirs and more particularly to improved waterflooding operations involving the injection of aqueous surfactant solutions.

In the recovery of oil from oil-bearing reservoirs, it usually is possible to recover only minor portions of the original oil in place by the so-called primary recovery methods which utilize only the natural forces present in the reservoir. Thus, a variety of supplemental recovery techniques have been employed in order to increase the recovery of oil from subterranean reservoirs. The most widely used supplemental recovery technique is waterflooding, which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus, it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions are commonly referred to as surfactant waterflooding or as low tension waterflooding, the latter term having reference to the mechanism involving the reduction of the oil-water interfacial tension. Thus far, many such waterflooding applications have employed anionic surfactants. For example, a paper by W. R. Foster entitled "A Low-Tension Waterflooding Process", Journal of Petroleum Technology, Vol. 25, Feb. 1973, pp. 205-210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One problem encountered in waterflooding with certain of the anionic surfactants such as the petroleum sulfonates is the lack of stability of these surfactants in a so-called "high brine" environment. These surfactants tend to precipitate from solution in the presence of monovalent salts such as sodium chloride in concentrations in excess of about 2 to 3 weight percent and in the presence of much lower concentrations of divalent metal ions such as calcium and magnesium ions. Typically, divalent metal ion concentrations of about 50 to 100 ppm and above cause precipitation of the petroleum sulfonates. The salinity of the surfactant slug is also significant with regard to interfacial tensions achieved through the use of petroleum sulfonates such as disclosed in the Foster paper. Even in the absence of divalent metal ions, optimum interfacial tensions are seldom achieved at salinities significantly in excess of 2 to 3 weight percent.

Various surfactant formulations which will tolerate high salinities and/or high divalent metal concentrations have been proposed for use in high brine environments. Thus, U.S. Pat. No. 3,508,612 to Reisberg et al. discloses a low tension waterflooding process employing a calcium-compatible anionic-nonionic surfactant system which can be employed in saline solutions containing from 0.01 to 5 molar NaCl and from about 0 to 0.1 molar $CaCl_2$. One of the anionic surfactants employed in the Reisberg et al. process is an organic sulfonate such as a petroleum sulfonate having an average molecular weight within the range of 430–470 and the other surfactant is a sulfated ethoxylated alcohol.

Another waterflooding technique involving the use of calcium-compatible surfactant systems is disclosed in U.S. Pat. No. 3,827,497 to Dycus et al. In this process, a three-component or two-component surfactant system may be employed. The three-component system comprises an organic sulfonate surfactant such as a petroleum sulfonate, a polyalkylene glycol alkyl ether, and a salt of a sulfonated or sulfated oxyalkylated alcohol. The two-component system comprises an organic sulfonate surfactant and a salt of a sulfonated oxyalkylated alcohol. These surfactant systems may be employed in a brine solution which, as noted in column 3, will usually contain about 0.05–8 percent sodium chloride and will often contain 50–5,000 ppm polyvalent metal ions such as calcium and/or magnesium ions. The sulfated or sulfonated oxyalkylated alcohols may be derived from aliphatic alcohols of 8–20 carbon atoms or from alkyl phenols containing 5–20 carbon atoms per alkyl group. The oxyalkyl moiety in this surfactant will usually be derived from ethylene oxide although other lower alkylene oxides containing 2–6 carbon atoms or mixtures thereof may be employed.

Another surfactant waterflooding process for use in high salinity environments is disclosed in U.S. Pat. No. 3,977,471 to Gale et al. This patent discloses the use of an $R_1$ hydrocarbyl ether-linked $R_2$ hydrocarbyl sulfonate. The $R_1$ lipophilic base is provided by a benzene, toluene, or xylene radical having an alkyl substituent containing 6–24 carbon atoms and the $R_2$ linking the sulfonate group with the alkoxy ether group is a $C_1$–$C_8$ alkyl, cycloalkyl, alkene or aryl radical. The $R_2$ hydrocarbyl group may be substituted with a hydroxy group or a $C_1$–$C_8$ aliphatic group. Dodecyl, dimethyl benzene ether propane sulfonate is specifically disclosed by Gale et al. The Gale et al. process is said to be particularly useful in reservoirs having high salinity brines, i.e., salinities of 2% or more, and the dodecyl, dimethyl benzene ether propane sulfonate is said to be stable in saline solutions containing from 7–14 weight percent sodium chloride.

Yet another surfactant waterflooding process for use in which brine environments is disclosed in U.S. Pat. No. 4,008,768 to Birk. This patent discloses an anionic-nonionic surfactant system suitable for use in aqueous environments exhibiting salinities within the range of 3–25 weight percent and containing divalent metal ions in amounts as high as 3 weight percent. A multicomponent surfactant system disclosed for use in the Birk process comprises an amide-linked sulfonate such as a di-substituted taurate containing a $C_{12}$–$C_{20}$ aliphatic group and a nonionic surfactant such as a polyethoxylated alkyl phenol or a polyethoxylated aliphatic alcohol.

SUMMARY OF THE INVENTION

In accordance with the present invention, there is provided a new and improved surfactant waterflooding process employing a water-soluble anionic surfactant which is designed for use in oil reservoirs in which the connate waters exhibit high salinities and/or divalent metal ion concentrations or in instances in which the available injection waters exhibit high salinities and/or divalent metal ion concentrations. In carrying out the invention, at least a portion of the fluid introduced into the reservoir via a suitable injection system is an aqueous liquid which contains a water-soluble anionic surfactant comprising a hydrocarbyl amino ether-linked alkane sulfonate wherein the hydrocarbyl group provides a lipophilic base. The ether linkage in the surfactant is provided by an alkoxy linkage having a ratio of carbon atoms to oxygen atoms within the range of 2 to 3. One form of surfactant for use in carrying out the invention is characterized by the formula:

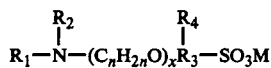  (1)

wherein
- $R_1$ is a lipophilic base provided by a $C_8$–$C_{20}$ aliphatic group or an aryl group substituted with a $C_6$–$C_{18}$ aliphatic group,
- $R_2$ is a $C_1$–$C_4$ aliphatic group,
- $n$ is 2 or 3,
- $x$ is a number within the range of 1–10,
- $R_3$ is a $C_1$–$C_4$ alkane group,
- $R_4$ is hydrogen, a hydroxy group or a methyl group, and
- M is an alkali metal, ammonium, or substituted ammonium ion. Another form of surfactant for use in carrying out the invention is a disulfonated derivative characterized by the formula:

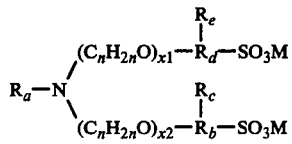  (2)

wherein
- $R_a$ is a lipophilic base provided by a $C_{10\text{-}l}$–$C_{25}$ aliphatic group or an aryl group substituted by a $C_8$–$C_{23}$ aliphatic group,
- $n$ is 2 or 3,
- $x_1$ and $x_2$ are each independently a number within the range of 1–10,
- $R_b$ and $R_d$ are each independently a $C_1$–$C_4$ alkane group,
- $R_c$ and $R_e$ are each independently a hydrogen, a hydroxy group, or a methyl group, and
- M is an alkali metal, ammonium, or substituted ammonium ion.

DESCRIPTION OF SPECIFIC EMBODIMENTS

This invention relates to the use of certain ether-linked alkane sulfonates in surfactant waterflooding. These ether-linked alkane sulfonates may be employed alone or they may be employed as cosurfactants in combination with hydrocarbon sulfonates of the type heretofore employed as waterflood surfactants. These hydrocarbon sulfonates, which normally take the form of petroleum sulfonates or in some cases synthetic alkylaryl sulfonates, function to decrease the interfacial tension between the injected flood water in the reservoir oil and thus increase the microscopic displacement efficiency of the oil by the water. The ether-linked alkane sulfonates may also be employed in combination with nonionic surfactants such as the type disclosed in the aforementioned patent to Birk or in combination with alcohols which function as surfactant cosolvents. Such alcohols typically will take the form of aliphatic alcohols having from 3–6 carbon atoms.

Ether-linked sulfonates are well known in the art. For example, Schwartz et al., SURFACE ACTIVE AGENTS AND DETERGENTS, Interscience Publishers, Inc., New York, Vol. II, at pages 74 and 75, disclose sulfonated polyethoxylated alkyl phenols and their method of preparation by reaction of an ethoxylated alkyl phenol with sodium ethanol sulfonate. In addition, Schwartz et al. disclose that ether-linked sulfonates may be prepared by the addition reaction of butane sultone with an alkyl phenol. As noted previously, the aforementioned patent to Dycus et al. discloses the use of ether-linked sulfonates in surfactant waterflooding operations in the presence of brines exhibiting high sodium chloride and high divalent metal ion concentrations. The aforementioned patent to Gale et al. discloses the use of certain ether-linked alkane sulfonates in the presence of brines containing up to 14 weight percent sodium chloride.

As distinguished from the sulfonated alkoxylated surfactants described above, the ether-linked alkane sulfonates of the present invention are characterized by an amino bridge between a hydrocarbyl group which provides a lipophilic base for the surfactant and the alkoxy alkane linkage to the functional sulfonate group. As understood by those skilled in the art, surfactant molecules are characterized by a lipophilic group which is oil soluble and tends to partition into the oil phase of an oil-water interface and a hydrophilic or polar group which tends to partition into the water phase. The hydrocarbyl portion of the ether-linked alkane sulfonates employed in the present invention is of sufficient chain link to provide a lipophilic base which is compatible with the water-soluble portion of the molecule to arrive at an appropriate hydrophilic-lipophilic balance (HLB) for the particular reservoir oil-water system involved.

It is well known to those skilled in the art that waterflood oil recovery processes involving the addition of surfactants to the injected water are specific with regard to the reservoirs in which they are applied. Thus, as recognized, for example, in the aforementioned patent to Gale et al. and the paper by Foster, the most effective HLB of the surfactant is dependent to some extent upon the ionic strength of the injected water and the connate water within the reservoir. Generally as the salinity due to the presence of monovalent salts such as sodium chloride or divalent salts such as calcium chloride or magnesium chloride increases, the HLB at which the most efficient oil recovery is achieved likewise increases. The hydrocarbyl group of the ether-linked alkane sulfonates employed in the present invention preferably contains from 8-29 carbon atoms, depending upon its structure and the structure of the hydrophilic portion of the surfactant which as described hereinafter may be either a monosulfonate or a disulfonate. Where the sulfonate is a monosulfonate, the hydrocarbyl group should contain from 8-24 carbon atoms and where it is a disulfonate, from 10-29 carbon atoms.

The ether linkage of the hydrocarbyl amino ether-linked alkane sulfonates employed in the present invention is provided by an alkoxylated group having a ratio of carbon atoms to oxygen atoms within the range of 2 to 3. Stated otherwise, the ether linkage is derived from ethylene oxide or propylene oxide or mixtures of ethylene oxide and propylene oxide. The ethylene oxide derivatives normally will be preferred because of their greater water solubility and, in a preferred embodiment of the invention, the ether linkage is provided by an ethoxy linkage containing from 1-10 ethylene oxide groups.

The lipophilic base of the ether-linked alkane sulfonates employed in the present invention may be provided by aliphatic groups or aliphatic-substituted aryl groups. Where the lipophilic base is provided by an aliphatic-substituted aryl group, the aryl component may be mononuclear (benzene) or dinuclear (naphthalene) and may contain one or more aliphatic substituents. Preferably the aryl component will be mononuclear in view of the practical considerations of economy and product availability. The aryl group is substituted with a $C_6$-$C_{18}$ aliphatic group in the case of the monosulfonate derivative and with a $C_8$-$C_{23}$ aliphatic group in the case of the disulfonate derivative. While the aryl group is preferably a benzene radical, toluene or xylene radicals may also be employed. In either case, the aryl group is substituted with a $C_6$-$C_{18}$ aliphatic group in the case of the monosulfonate derivative and a $C_8$-$C_{23}$ aliphatic group in the case of the disulfonate derivative. Where the lipophilic base is provided by an aliphatic radical, it should contain from 8-20 carbon atoms in the case of the monosulfonate derivative and 10-25 carbon atoms in the case of the disulfonate derivative. The aliphatic groups or aliphatic substituents may be unsaturated and/or contain branched chains but usually will take the form of normal alkyl radicals.

As noted previously, the surfactants employed in carrying out the present invention may be monosulfonates or polysulfonates. One preferred form of sulfonate is an aliphatic or aliphatic-substituted aryl amino alkoxy alkane monosulfonate characterized by the formula:

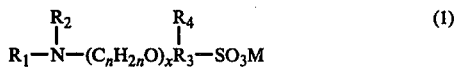

$$R_1-N(-(C_nH_{2n}O)_xR_3-SO_3M \quad \text{with } R_2, R_4 \text{ substituents}) \tag{1}$$

wherein
  $R_1$ is a lipophilic base provided by a $C_8$-$C_{20}$ aliphatic group or an aryl group substituted with a $C_6$-$C_{18}$ aliphatic group,
  $R_2$ is a $C_1$-$C_4$ aliphatic group,
  $n$ is 2 or 3,
  $x$ is a number within the range of 1-10,
  $R_3$ is a $C_1$-$C_4$ alkane group,
  $R_4$ is hydrogen, a hydroxy group or a methyl group, and
  M is an alkali metal, ammonium, or substituted ammonium ion.

Where M is an alkali metal ion, it usually will take the form of sodium or potassium. Substituted ammonium ions which may be employed include mono-, di-, or tri-substituted alkylammonium or alkanolammonium ions. Examples of alkylammonium ions include methylammonium, ethylammonium, and normal- or iso-propylammonium ions. Examples of alkanolammonium ions include monoethanolammonium and triethanolammonium ions.

As noted previously, the ether linkage preferably is provided by one or more ethylene oxide groups because of the increased water solubility imparted to the molecule. Preferably the ether linkage contains from 1-4 ethylene oxide units. Thus, in a preferred form of surfactant characterized by formula (1), $n$ is 2 and $x$ is a number within the range of 1-4. It is further preferred that the substituent, $R_2$, be a methyl group. In the case where $R_1$ is an aliphatic group, i.e., where the lipophilic base does not include an aromatic nucleus, it preferably contains from 14-18 carbon atoms. In the case where $R_1$ is an aliphatic-substituted aryl group, the aliphatic substituent preferably contains from 12-16 carbon atoms. In this instance, as noted previously, it is desirable that a mononuclear aryl radical such as benzene, toluene, or xylene be employed. As indicated by formula (1), the alkane bridge between the ether group and the sulfonate group is provided by a $C_1$-$C_4$ alkane group which may be unsubstituted or which may be substituted by a hydroxy group or a methyl radical. Preferably, however, the alkane linkage is provided by an ethane or propane group without methyl substitution, that is, $R_3$ contains 2 or 3 carbon atoms and $R_4$ is a hydrogen atom or hydroxy group.

The surfactants characterized by formula (1) may be prepared by alkoxylation of a secondary amine. The resulting ethoxylated or propoxylated adduct may then be reacted with a sultone and base to produce the sulfonate derivative.

By way of example, sodium tetradecyl methyl amino polyethoxy propane sulfonate may be prepared by first reacting ethylene oxide with methyltetradecylamine to produce the ethoxylated adduct. The mole equivalent of ethylene oxide relative to the mole equivalent of the secondary amine is varied, as will be understood by those skilled in the art, in order to arrive at the desired number of ethylene oxide units in the ether linkage. Thereafter, the ethoxylated product is reacted with propane sultone and base (e.g. sodium hydroxide) to produce the sulfonate. The hydroxyalkane sulfonates and the methyl alkane sulfonates can be prepared by a similar reaction procedure. Thus, the ethoxylated secondary amine may be reacted with 3-methylpropane sultone or 3-hydroxypropane sultone to form the methyl- or hydroxy-substituted alkane sulfonate, respectively.

The aliphatic-substituted aryl derivatives characterized by formula (1) can similarly be prepared by alkoxylation of the appropriate secondary amine. Thus dodecyl benzyl, methyl amino polyethoxy propane sulfonate can be prepared by reacting dodecyl N-methylaniline with ethylene oxide in the appropriate mole equivalent amounts and then reacting this product with propane sultone and sodium hydroxide as described previously.

A preferred form of disulfonate which may be employed in carrying out the invention is characterized by the formula:

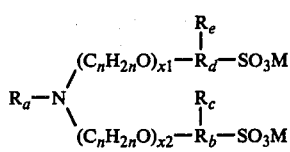

wherein
- $R_a$ is a lipophilic base provided by a $C_{10}$–$C_{25}$ aliphatic group or an aryl group substituted by a $C_8$–$C_{23}$ aliphatic group,
- $n$ is 2 or 3,
- $x_1$ and $x_2$ are each independently a number within the range of 1–10,
- $R_b$ and $R_d$ are each independently a $C_1$–$C_4$ alkane group,
- $R_c$ and $R_e$ are each independently a hydrogen, a hydroxy group, or a methyl group, and
- M is an alkali metal, ammonium, or substituted ammonium ion.

As is the case with the monosulfonated derivatives, the ether linkages preferably are provided by one or more ethylene oxide groups. In most cases it will be preferred that each ether linkage contain from 1 to 4 ethylene oxide units. Thus, in a preferred form of surfactant characterized by formula (2), $x_1$ and $x_2$ will each independently be a number within the range of 1 to 4. As indicated by formula (2) above, the lipophilic base may be provided by a somewhat longer hydrocarbon group because of the increased water solubility imparted to the molecule by the two sulfonate groups. In the case where $R_a$ is an aliphatic group, it preferably contains from 16–20 carbon atoms and where $R_a$ is an aliphatic-substituted aryl group the aliphatic substituent preferably contains from 14–18 carbon atoms. The considerations described previously with respect to the alkane bridges between the ether and sulfonate groups apply to the disulfonated derivatives characterized by formula (2). Thus, it is preferred that the alkane bridges be provided by unsubstituted ethane or propane groups or hydroxy substituted ethane or propane groups.

The disulfonates characterized by formula (2) can be prepared by reactions similar to those employed for the monosulfonates except that a primary amine is employed as the starting material.

When a primary amine is employed as the starting material, both hydrogens on the primary amine are replaced by formation of the dialkoxylated adduct, i.e., two ethoxy chains are attached to the nitrogen. This adduct may then be reacted with a sultone and base, e.g. propane sultone and sodium hydroxide, to produce the disulfonate derivative. By way of example, sodium hexadecyl amino di(polyethoxy propane sulfonate) may be prepared by first reacting ethylene oxide with hexadecyl amine to produce the di-polyethoxylated adduct. The number of ethylene oxide units in the polyethoxy chain is varied by proper control of the mole ratio of ethylene oxide to primary amine, as will be understood by those skilled in the art. Thereafter, the di-polyethoxylated product is reacted with propane sultone and base (e.g. sodium hydroxide) to produce the di(polyethoxy propane sulfonate) derivative. The hydroxyalkane sulfonates and the methyl alkane sulfonates can be prepared by a similar reaction procedure. Thus, the di-polyethoxylated primary amine may be reacted with 3-methylpropane sultone or 3-hydroxyproane sultone to form the methyl- or hydroxy-substituted alkane sulfonates, respectively.

The amino and alkoxy groups of the ether-linked alkane sulfonates used in carrying out the invention tend to promote tolerance for "high brine" environments, that is, tolerance to high salinities and/or high concentrations of divalent metal ions. In addition, the amino linkage is not readily subject to hydrolytic degradation at the elevated temperatures normally encountered in reservoirs undergoing waterflooding. Thus, a preferred application of the present invention is in those situations in which the reservoir waters and/or the waters employed in formulating the flooding medium exhibit divalent metal ion concentrations in excess of about 500 ppm or salinities in excess of about 3 weight percent.

The hydrocarbyl amino ether-linked alkane sulfonates may be employed in accordance with the present invention in any suitable concentration depending upon the characteristics of the particular reservoir involved and such factors as surfactant consumption, e.g. by adsorption, and dispersion of the surfactant into the reservoir waters. In most cases, the surfactant will be employed in a concentration within the range of 0.1–2.0 weight percent and preferably in a concentration within the range of 0.2–1.0 weight percent. The hydrocarbyl amino ether-linked alkane sulfonates may be employed as cosurfactants in combination with other anionic or nonionic surfactants as described previously. In this case, the hydrocarbyl amino ether-linked alkane sulfonate may be employed in a concentration within the range of 0.1–1.0 weight percent with the other surfactant present in a concentration within the range of 0.1–1.0 weight percent. Where an alcohol is employed as a cosolvent, it normally will be present in an amount within the range of 0.1–1.5 weight percent.

The present invention may be carried out in conjunction with the use of a thickening agent added for mobility control purposes. The thickening agent may be added to the aqueous surfactant slug containing the hydrocarbyl amino ether-linked alkane sulfonate or it may be injected in a separate mobility control slug. Normally, the thickening agent will be employed in a separate mobility control slug injected immediately after the slug containing the surfactant. The thickening agent may be added in concentrations so as to provide graded viscosity at the trailing edge of the mobility control slug or graded viscosities at both the leading and trailing edges of the mobility control slug. Alternatively, the thickening agent concentration may be relatively constant throughout. Normally, the viscosity of at least a portion of the mobility control slug should be at least as great as that of the reservoir oil and typically it will be within the range of about 1–4 times the viscosity of the reservoir oil. Various thickening agents which may be employed for mobility control purposes are well known to those skilled in the art and include such polymers as Polysaccharide B-1459 available from the Kelco Company under the trade name "Kelzan" and the various partially hydrolyzed polyacrylamides available from the Dow Chemical Company under the trade name "Pusher Chemicals".

While the aqueous solution of hydrocarbyl amino ether-linked alkane sulfonate, either alone or as a cosurfactant or with a cosolvent, may be employed as the sole displacing fluid, it will usually be injected as a discrete slug and then followed by a driving fluid. Preferably, the aqueous surfactant solution is injected in an amount of at least 0.1 pore volume. Typically the size of the surfactant slug will be within the range of 0.2–0.5 pore volume. Where a relatively viscous mobility control fluid is employed, as described previously, the mobility control fluid normally will be injected in an amount within a range of 0.2–0.5 pore volume. Thereafter, a driving fluid is injected in order to displace the previously injected fluids through the formation. The driving fluid typically may be any water which is locally available and is not incompatible with the formation. The driving fluid is injected in such amount as necessary to carry the recovery process to its conclusion.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume", as used herein, in meant that volume of the portion of the formation underlying the well pattern employed, as described in greater detail in the Burdyn et al. patent.

I claim:

1. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous liquid containing a water-soluble anionic surfactant characterized by the formula:

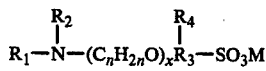

wherein
is a lipophilic base provided by a $C_8$–$C_{20}$ aliphatic hydrocarbon group or an aryl group substituted with a $C_6$–$C_{18}$ aliphatic hydrocarbon group,
$R_2$ is a $C_1$–$C_4$ aliphatic group,
$n$ is 2 or 3,
$x$ is a number within the range of 1–10,
$R_3$ is a $C_2$–$C_4$ alkane group,
$R_4$ is hydrogen, a hydroxy group or a methyl group, and
M is an alkali metal, ammonium, or substituted ammonium ion.

2. The method of claim 1 wherein $R_1$ is a $C_{14}$–$C_{18}$ aliphatic group or an aryl group substituted with a $C_{12}$–$C_{18}$ aliphatic group, $R_2$ is a methyl group, $n$ is 2, and $x$ is a numbr within the range of 1–4.

3. The method of claim 2 wherein $R_3$ contains 2 or 3 carbon atoms and $R_4$ is hydrogen.

4. The method of claim 2 wherein $R_3$ contains 2 or 3 carbon atoms and $R_4$ is a hydroxy group.

5. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous liquid containing a water-soluble anionic surfactant characterized by the formula:

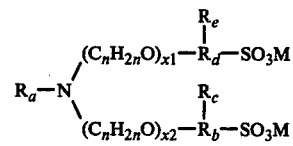

wherein
$R_a$ is a lipophilic base provided by a $C_{10}$–$C_{25}$ aliphatic hydrocarbon group or an aryl group substituted by a $C_8$–$C_{23}$ aliphatic hydrocarbon group,
$n$ is 2 or 3,
$x_1$ and $x_2$ are each independently a number within the range of 1–10,
$R_b$ and $R_d$ are each independently a $C_2$–$C_4$ alkane group,
$R_c$ and $R_e$ are each independently a hydrogen, a hydroxy group, or a methyl group, and
M is an alkali metal, ammonium, or substituted ammonium ion.

6. The method of claim 5 wherein $R_a$ is a $C_{16}$–$C_{20}$ aliphatic group or an aryl group substituted with a $C_{14}$–$C_{18}$ aliphatic group, $n$ is 2, and $x_1$ and $x_2$ are each independently a number of within the range of 1–4.

7. The method of claim 6 wherein $R_b$ and $R_d$ each independently contains 2 or 3 carbon atoms and $R_c$ and $R_e$ are hydrogen.

8. The method of claim 6 wherein $R_b$ and $R_d$ each independently contains 2 or 3 carbon atoms and $R_c$ and $R_e$ are hydroxy groups.

* * * * *

UNITED STATES PATENT AND TRADEMARK OFFICE
CERTIFICATE OF CORRECTION

PATENT NO. : 4,138,345
DATED : February 6, 1979
INVENTOR(S) : Sherrod A. Williams It is certified that error appears in the above-identified patent and that said Letters Patent are hereby corrected as shown below:

Column 2, line 34, "0.05" should read --0.5--;
line 63, "which brine" should read --high brine--.
Column 3, line 57, "$C_{10-1}-C_{25}$" should read --$C_{10}-C_{25}$--.
Column 8, line 1, "3-hydroxyproane" should read --3-hydroxypropane--.
Column 9, line 27, "in meant" should read --is meant--;
line 47, "is a lipophilic" should read --$R_1$ is a lipophilic--.
Column 10, line 46, "number of within" should read --number within--.

This certificate supersedes Certificate of Correction issued May 1, 1979.

Signed and Sealed this

Thirty-first Day of July 1979

[SEAL]

Attest:

*Attesting Officer*

LUTRELLE F. PARKER
*Acting Commissioner of Patents and Trademarks*